United States Patent [19]
Engel

[11] Patent Number: 5,098,729
[45] Date of Patent: Mar. 24, 1992

[54] PROCESS FOR PRODUCING SYNTHETIC CHEESE

[75] Inventor: Martin E. Engel, Libertyville, Ill.

[73] Assignee: Kraft General Foods, Inc., Glenview, Ill.

[21] Appl. No.: 538,241

[22] Filed: Jun. 14, 1990

[51] Int. Cl.$^5$ .......................... A23C 20/00; A23L 1/15
[52] U.S. Cl. .................................. 426/582; 426/330.2; 426/334; 426/424; 426/425; 426/506
[58] Field of Search .................. 426/330.2, 334, 424, 426/425, 506, 582

[56] References Cited

U.S. PATENT DOCUMENTS 3,886,300  5/1975  Fujii ................................. 426/582
4,459,313  7/1984  Swanson et al. ................... 426/582

*Primary Examiner*—Marianne Cintins
*Assistant Examiner*—Helen Pratt
*Attorney, Agent, or Firm*—Fitch, Even, Tabin & Flannery

[57] ABSTRACT

The present invention is directed to a method for manufacture of an imitation cheese using an acid casein or rennet casein which has been treated to remove stale flavors in accordance with the invention. In the method of the invention for removing stale flavors from acid casein or rennet casein, an initial mixture of dried casein and water is provided. The casein is maintained in suspension in the water for a period of time sufficient to substantially hydrate the casein. While the casein is maintained in suspension, water is removed from the initial mixture. At the same time that water is removed from the mixture, fresh makeup water is added to the mixture at substantially the same level that the water is removed from the mixture. The casein is then recovered from the mixture by a suitable process, such as by centrifugation.

30 Claims, 2 Drawing Sheets

PROCESS FOR PRODUCING SYNTHETIC CHEESE

FIELD OF THE INVENTION

The present invention relates generally to the manufacture of synthetic or imitation cheese-like food products. More particularly, the present invention relates to a method for removing stale or off flavors from casein which is intended for use in the manufacture of food products, such as synthetic or imitation cheese-like food products non-dairy creamers, whipped toppings, confections, frozen desserts, beverages and other food products requiring a source of bland tasting proteins.

BACKGROUND OF THE INVENTION

For purposes of the present application, an imitation cheese is defined as those cheese-like products wherein at least part of the fat is a non-milk fat and wherein the solids are at least partially derived from acid or rennet casein or caseinates. These products may contain some non-fat milk solids and some milk fat. Imitation cheese products are made by a process wherein the ingredients are emulsified and pasteurized. In a typical process for the preparation of imitation cheese products, acid or rennet casein or a caseinate salt (either calcium or sodium caseinate) is blended with a liquid vegetable oil in a ribbon blender. The caseinate/liquid oil blend is then added to a lay down cooker and any water required is added along with any emulsifier salts which are to be used. Heat and agitation are then used to solubilize the casein. The usual temperature range of heating is 165° F. to 195° F. A homogeneous plastic mass, much like process cheese, is formed during the heating and agitation steps. The homogeneous plastic mass is discharged from the lay down cooker in accordance with usual process cheese making procedures.

Casein can be separated from the whey proteins of skim milk by acid precipitation at pH 4.3–4.6 and by coagulation with rennet, or other proteolytic enzymes. In the preparation of acid casein, skim milk is cultured with lactic acid-producing organisms, usually streptococcus lactic or streptococcus cremoris, until it coagulates at pH 4.3–4.6, which is the isoelectric pH of the casein complex. The coagulum is broken and heated to about 120° F. to expel whey, is thoroughly washed, pressed, ground, dried and milled. Alternatively, lactic acid, hydrochloric acid or sulphuric acid may be added directly to agitated skim milk until the desired pH is attained. The temperature is raised to 110°–115° F. to enhance precipitation of the casein, which is collected and processed. Acid casein is usually designated according to the acid utilized in its production, such as lactic casein, hydrochloric acid casein or sulphuric acid casein. Acid caseins are insoluble unless the pH is adjusted with a suitable base to provide an alkali or alkaline earth caseinate.

When rennet is added to skim milk, colloidal casein is destabilized and forms a gel. Sufficient rennet and calcium chloride is added to skim milk at about 85° F. to yield a coagulum in twenty to thirty minutes. Agitation is initiated following the onset of coagulation to reduce the particle size and to optimize processing. After raising the temperature to 130° F. to 150° F. to expel whey, the curd is collected and processed. Rennet casein is also insoluble.

Both acid casein and rennet casein have long been used in the manufacture of imitation cheese. Problems arise, however, when acid casein or rennet casein is stored for any substantial period of time prior to use. As indicated above, acid casein and rennet casein are usually dried prior to storage and in the dried form usually contain about 10% to 12% moisture. Stale and off flavors can rapidly occur if the storage conditions for acid casein and rennet casein are not optimum, i.e., if stored at relatively high temperature or at relatively high humidity conditions.

U.S. Pat. No. 4,197,322 to Middleton recognizes the problem of stale flavors in acid casein which is to be used in the manufacture of imitation cheese. The Middleton patent is directed to a method for removing the off flavors from acid casein, prior to using the casein to produce an imitation cheese. In the process of the Middleton patent for producing an imitation cheese, an aqueous suspension of acid casein containing undersirable flavor and odor elements is formed into an aqueous suspension having a solids content of from about 3% to about 15%. The acid casein is reacted with a basic calcium salt and a neutral calcium salt to form a calcium caseinate solution essentially free of observable solids. This is in accordance with standard methods for producing caseinates which is achieved by the slow addition of a suitable alkali to a suspension of insoluble acid casein. In the method of the Middleton patent the calcium caseinate solution is adjusted in pH to from about 5.9 and 6.9 by the addition of an acid. Thereafter, rennet is added to the solution of calcium caseinate to form a rennet curd in a supernate aqueous solution. The rennet curd is separated from the aqueous portion which contains the undesirable odor and flavor elements present in the original acid casein. The rennet curd is mixed with an edible oil, salt and an edible emulsifying agent at a temperature of about 140° F. to produce a smooth admixture. An acid is then added to the admixture to acidify the blended product to a pH of 5 or above. The admixture is then vigorously mixed under homogenizing conditions to produce a homogeneous melted and pasteurized imitation cheese product.

U.S. Pat. No. 3,922,374 to Bell et al. discloses the preparation of an imitation cheese from acid casein by forming calcium or sodium casinate in-situ. A formulation containing water and acid casein is prepared to which sodium hydroxide or calcium hydroxide is added. Fat is added to the formulation as well as other ingredients, such as emulsifying salts. The final product contains sufficient acid to achieve a product pH of about 5. The Bell et al. patent, however, does not recognize or provide any method for removing stale flavors from acid casein.

U.S. Pat. No. 4,444,800 to Bixby et al. is directed to a method for the manufacture of a simulated cheese product that is prepared from dry, particulate rennet casein. The imitation cheese product is prepared by mixing particulate rennet casein and an edible solvation agent with water. The solvation agent is substantially similar to emulsifying salts normally used in the preparation of process cheese. A fat or an oil is blended into the admixture of rennet casein and solvation agent and sufficient quantities of flavoring agents and acidulants are added to impart the desired product flavor and pH. The mixture so formed is agitated under high sheer at a temperature of about 190° F. to 205° F. and is maintained at this temperature with sufficient severity of sheering agitation for a time period of two to four minutes to solvate the rennet casein that is present and to provide a plastic body to the simulated cheese product. The Bixby et al. patent also does not recognize the problems associated with stale flavors in rennet casein.

While various methods are known for producing imitation cheese from acid casein and rennet casein, it would be desirable to provide a simple and economical process for removing stale and off flavors from acid casein and rennet casein prior to using the acid casein or rennet casein in the manufacture of an imitation cheese product.

Accordingly, it is an object of the present invention to provide a method for the manufacture of imitation cheese from acid casein or rennet casein wherein the stale and off flavors of acid casein or rennet casein are removed prior to manufacture of the imitation cheese product.

It is another object of the present invention to provide a method for removing stale and off flavors from acid casein and rennet casein prior to the use of the acid casein and rennet casein in the manufacture of food products, such as imitation cheese.

These and other objects will become more apparent from the following detailed description.

SUMMARY OF THE INVENTION

The present invention is directed to a method for manufacture of an imitation cheese using an acid casein or rennet casein which has been treated to remove stale flavors in accordance with the invention. For ease of discussion, the term "casein" is sometimes used to denote both acid casein and rennet casein. The term "casein", as used herein does not encompass alkali caseinates which are prepared from acid casein. In the method of the invention for removing stale flavors from casein, an initial mixture of dried casein and water is provided. The casein is maintained in suspension in the water for a period of time sufficient to substantially hydrate the casein. After hydration and while the casein is maintained in suspension, water is removed from the initial mixture. At the same time that water is removed from the mixture, fresh makeup water is added to the mixture at substantially the same level that the water is removed from the mixture. The casein is then recovered from the mixture by a suitable process, such as by centrifugation.

DETAILED DESCRIPTION OF THE INVENTION

Generally, in accordance with various features of the present invention, it has been determined that the method of the invention for removing stale flavors from acid casein or rennet casein can be optimized if attention is paid to various operating features of the invention. In particular, the particles of acid casein or rennet casein should be kept insoluble throughout the steps of the method. This is attained by maintaining the pH of the mixture at or near the isoelectric pH of the casein at the temperature at which the casein is being processed. It has also been determined that the casein should be thoroughly hydrated prior to beginning further steps of the method of the invention. Hydration time is longer than has been generally appreciated. In particular, it has been determined that at least about thirty minutes are required to effect substantially complete hydration of the casein. It has also been determined that sufficient water removal and makeup water should be provided to effect substantial removal of the offending stale flavors from the casein. Finally, it has been determined that temperature is a factor in providing a casein product with a bland flavor which does not revert to a stale flavor shortly after being made into an imitation cheese.

Figure 2:
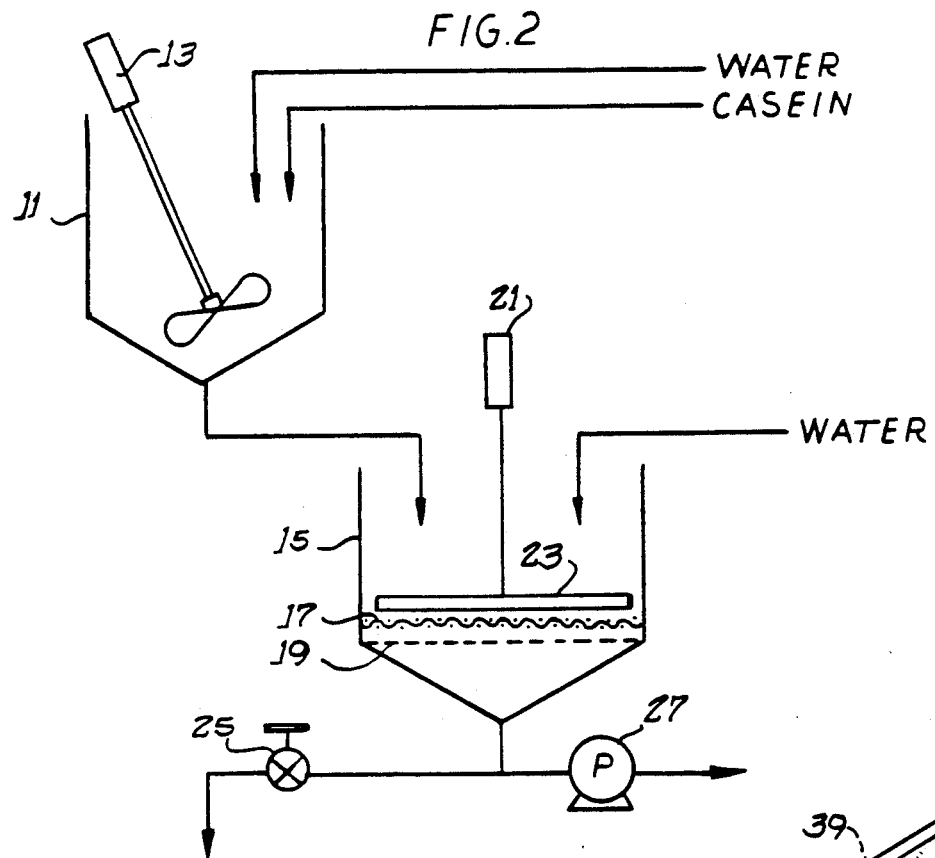
FIG. 2 is a schematic diagram of a batch process for use in the present invention.

Referring now to FIG. 2, water and casein are first charged into hydration tank 11. The water is preferably at a temperature of 135° F. to 140° F. during the hydration step. Heated water is not required but hydration may be less effective if heated water is not used. The casein is charged into the hydration tank 11 at a level to provide from about 8% to about 15% casein solids in the hydration tank. All percentages used herein are by weight unless otherwise indicated. The casein and water mixture in the hydration tank 11 is mixed with a suitable mixer, such as a propeller mixer 13, for a period of time sufficient to effect hydration of the casein.

Figure 1:
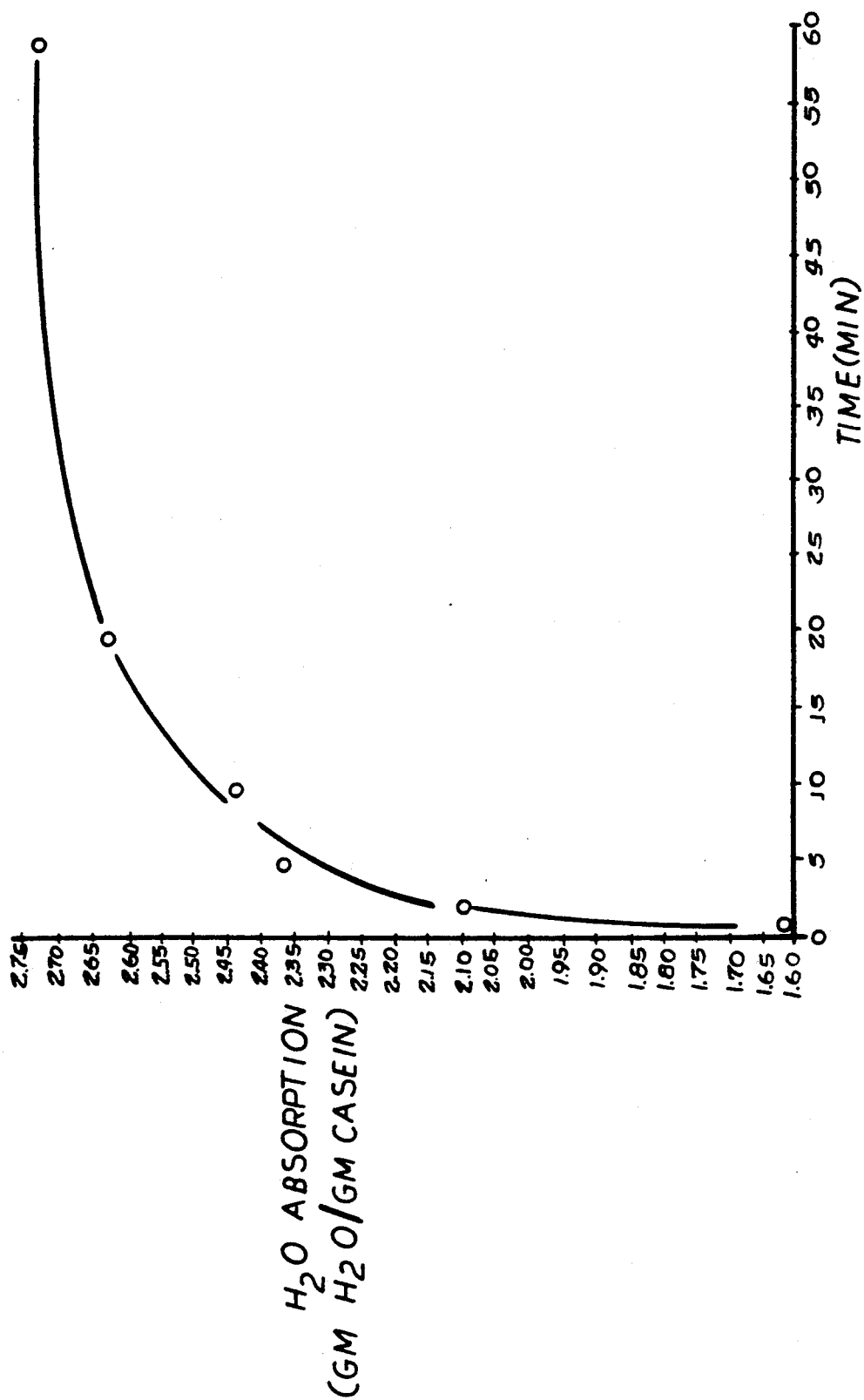
FIG. 1 is a plot of casein water absorption versus time.

As shown in FIG. 1, absorption of water continues to increase over a period of time up to sixty minutes. The absorption of water in grams water per gram of casein was determined by the following method. A 10 gram quantity of dried commercial casein having a residual moisture of 11% is mixed with 190 cc of water for various increments of time, i.e., 1, 2, 5, 10, 20 . . . 60 minutes. After mixing for the given time increment, the total mixture is quickly poured into a pre-weighed conical folded Whadman #4 filter sheet and gravity drained until free flow of water ceases, i.e., a time of 30 seconds or less. The filter sheet and casein cake are weighed and the casein cake weight is determined. The absorption of water is determined in weight of the casein cake and the initial weight of casein used.

As can be seen in FIG. 1, the amount of absorption tails off after about thirty minutes and a hydration time of thirty minutes is usually sufficient although it is preferred that the hydration time be within the range of thirty minutes to ninety minutes. Longer times may be used but do not provide any additional benefit.

After the casein has been hydrated, it is transferred to a treatment tank 15. Treatment tank 15 is provided with a macro filter 17 at the bottom of the tank. The macro filter 17 has a pore size sufficient to restrain passage of casein particles but readily passes water therethrough. The macro filter 17 may be made from any suitable foraminous material, such as plastic or wire mesh screen, porous glass, porous ceramics or sintered metal, having a pore size of from about 30 to about 120 microns. For reasons of economy, the macro filter 17 is preferably a plastic or wire mesh screen having a pore size of from about 30 to about 120 microns. Since commercially available plastic and metal wire mesh screens are relatively flexible and cannot support their weight under the pressure of the water to be added to the hydration tank, a support plate 19 is provided for backing the wire mesh screen. Support plate 19 is preferably a stainless steel plate having relatively large perforations of at least about 1/16th inch.

Prior to transfer of the hydrated casein to the treatment tank 15, an initial charge of wash water is preferably added to the treatment tank 15 and the mixer 21 is activated. As shown, mixer 21 has a paddle 23 which extends substantially across the diameter of treatment tank 15 in a close tolerance fit with the walls of hydration tank 17. The bottom edge of the paddle is preferably located within from about ¼ inch to about 1 inch of the macro screen. With the location of the paddle within the ¼ inch to 1 inch position, flux loss, i.e., passage of casein through the macro filter 17, is limited.

The flux rate of water through macro filter 17 is sufficient such that no pump is required to remove water from the bottom of treatment tank 15. A valve 25 is used to control the flow rate of water exiting from the bottom of treatment tank 15 through outlet conduit 18. As water is removed from the bottom of treatment tank 15, fresh makeup water is added to the top of treatment tank 15. Preferably, the flow rate of water exiting from the bottom of treatment tank 15 is such that a volume of water equivalent to the water initially charged into hydration tank 11 with the casein is permitted to exit from treatment tank 15 in a period of from about 3 to about 15 minutes. Water is removed from treatment tank 17 for a period of time and at a level sufficient to remove and make up from about 5 to about 8 times the amount of water present in the initial mixture of water and casein in hydration tank 11. The total time for removal of water and makeup of water is preferably from about 30 minutes to about 150 minutes. Preferably, the rate of water removal from the bottom of treatment tank 15 and the rate of addition of makeup water to treatment tank 15 is such that the solids level of the casein mixture in treatment tank 15 is maintained at a level of from about 8% to about 15%.

The water temperature used in the hydration of the casein in hydration tank 11 and the water added to treatment tank 17 can be ambient temperature water. It has been determined that a bland tasting casein can be prepared with ambient water. However, it has also been determined that a process cheese product made using casein treated with ambient temperature water quickly reverts to a stale flavor after the process cheese has been manufactured. While not wishing to be bound by any theory, it is believed that certain flavor precursors for stale and off flavors can only be removed through the use of water which has been heated to a temperature in the range from about 100° F. to about 150° F., preferably in the range of from about 130° F. to about 140° F. At temperatures lower than 100° F., flavor reversion still remains a problem. Temperatures above about 150° F. do not provide any additional benefit.

While acid casein and rennet casein are insoluble in water at pH levels up to neutral, it is preferred that the pH of the water during the hydration stage in hydration tank 11 and during the treatment stage in treatment tank 15 be near the isoelectric pH of the casein at the temperature that is used. In general, this will be a pH of from about 4.3 to about 4.7. Even when the pH is maintained at the isoelectric point of the casein some protein loss occurs during the treatment of the present invention.

After the casein has been treated by the method of the present invention utilizing withdrawal of water through a foraminous material having a pore size of from about 30 to about 120 microns, the casein dispersion is removed through an outlet conduit 20 located just above macro filter 17. The flow of the casein dispersion through conduit 20 is controlled by opening valve 22 and closing valve 25. The casein dispersion is pumped by pump 27 to suitable equipment for separating the casein from the water. One method is to spray dry the casein dispersion to provide a dried casein product. A preferred method of separation is by centrifugal extraction and a basket centrifuge will remove sufficient water to provide a casein product having from about 40% to about 60% moisture. Such product is suitable as is for use in the manufacture of process cheese or the casein can be dried.

Figure 3:
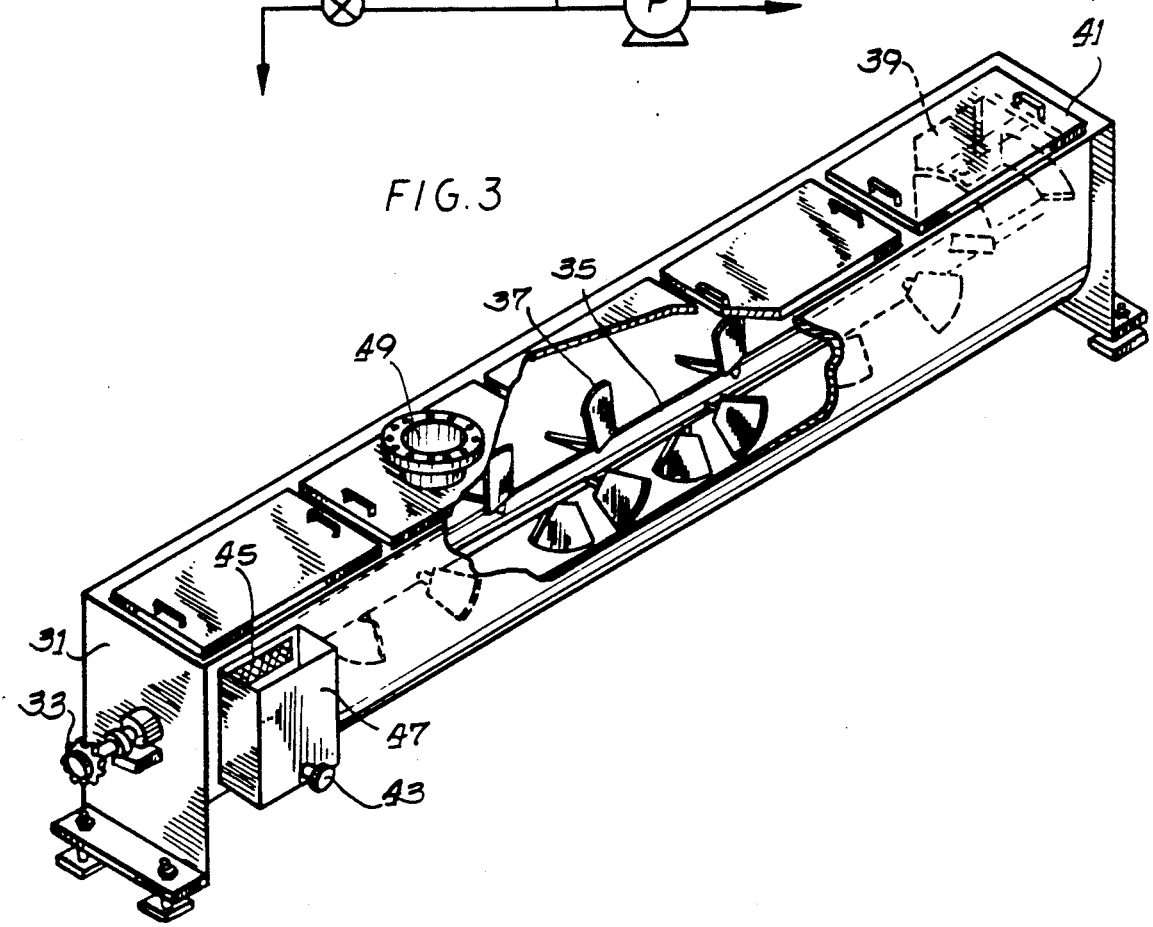
FIG. 3 is a perspective view, partially broken away, of a countercurrent extractor useful in the process of the present invention.

The method of the present invention is also adapted to continuous operation by equipment such as shown in FIG. 3. FIG. 3 depicts a countercurrent extraction apparatus which may be used in the practice of the present invention. The apparatus includes a housing 31, drive means, not shown, which attach to drive wheel 33. The drive wheel 33 operates shaft 35, which has paddles 37, which move solids toward solids outlet 39. The housing has a liquid inlet 41 and a liquid outlet 43. To prevent solids from being removed through liquid outlet 43, a screen 45 may be placed over the opening into a weir box 47. The hydrated casein suspension is admitted into solids inlet 49. In operation, the rate of admission of the prehydrated casein suspension into solids inlet 49 is the same as solids removal from solids outlet 39. The liquid inlet material is adjusted to be the same as liquid outlet material. The liquid inlet rate is from about 5 to about 8 times the rate of liquid associated with the casein suspension admitted into solids inlet 49.

The following Examples further illustrate various features of the invention but are intended to in no way limit the scope of the invention which is defined in the appended claims.

EXAMPLE 1

A 100-gallon, scraper-agitated, hydrating tank is filled with about 85 gallons of water adjusted to a pH 4.5 with lactic acid and warmed to 100° F. Two bags of lactic casein (110 pounds) are dumped into the hydrating tank (stirrer on) to begin the hydration. The lactic casein has been stored for a substantial period of time and has a pronounced stale flavor. About 30 gallons of pH 4.5, 135° water is pumped into a treatment tank having a conical bottom. The treatment tank is fitted with a 120×120 mesh stainless screen supported by a perforated plate. The screen and plate are positioned slightly above the beginning of the slope of the conical bottom. The screen filter is held in place by a segmented ring and a central holdown, both bolted in place. The tank has a four-blade agitator which extends to the walls of the tank and can be rotated at a speed of up to 65 rpm, ¼ to 2 inches above the screen.

When the casein has been hydrated sixty minutes, the casein slurry is pumped into the treatment tank with the agitator operated at 40 rpm and located one-inch above the screen filter. As the level approaches the top of the tank, the bottom valve on the treatment tank is opened and the level maintained constant with fresh make-up water until the full hydrated batch is transferred. The agitator is adjusted to a speed of 65 rpm. Fresh wash water (135° F. and pH 4.5) is immediately pumped into the treatment tank and the bottom valve is adjusted to match incoming and outgoing rates. Temperatures, pHs and flow rates are maintained until 700 gallons of pH adjusted wash water are added to the treatment tank to wash the suspended casein over a period of 70 minutes. This, of course, corresponds to the removal of 700 gallons of water containing off flavor components from the bottom of the treatment tank. The deflavored casein slurry is then transferred intermittently to a 14-inch basket centrifuge for dewatering at 100 g's. The deflavored casein containing about 50% moisture is refrigerated until processed into an analog cheese. The deflavored casein has a mild, bland typical fresh lactic casein flavor.

EXAMPLE 2

An imitation cheese was then prepared from the deflavored casein produced in accordance with Example 1. The imitation cheese has the following components at the indicated levels:

| Ingredient | Weight Percent | Total Solids |
| --- | --- | --- |
| Deflavored Casein (50% solids) | 32.675 | 16.025 |
| Partially hydrogenated soybean oil | 20.34 | 20.34 |
| Citric Acid (23% citric acid slurry) | 2.6 | .6 |
| Sorbic Acid | .19 | .19 |
| Colors and flavors | 2.875 | 1.365 |
| Whey | 7.5 | 7.2 |
| Vitamin/Mineral Premix | .03 | .03 |
| Corn Syrup Solids (Frodex 24) | .78 | .75 |
| Sodium Chloride | 1.6 | 1.6 |
| Trisodium phosphate | 3.17 | 1.6 |
| Tricalcium phosphate | 1.3 | 1.3 |
| Water | 26.94 | |
| Total | 100 | 51 |

The deflavored casein is blended in a blender for 12 minutes and sampled to test moisture. The partially hydrogenated soybean oil, color, sorbic acid, and flavors are added to the blender. Blending is continued until evenly mixed. Whey, vitamin/mineral premix and FroDex 24 (corn syrup solids) are added and mixing is continued until they are blended into the mix. Water is added as required. The entire mixture is blended for 10 minutes. A portion (5-10 pounds) of the casein mixture is transferred to a preheated cooker and the trisodium phosphate and tricalcium phosphate are added. Steam is turned on high and the auger is started in the cooker. The remaining casein mixture (25-30 pounds) is added and the mixture is heated to 185° F. The citric acid slurry is slowly added to the heated mass to lower the pH to 5.72 and provide a homogeneous, molten imitation cheese product.

The imitation cheese product of the invention is formed into cheese slices which are packaged into single slices. The imitation cheese slices of the invention are compared with commercially available imitation cheese slices. The taste and mouthfeel of the imitation cheese slices are judged to be equivalent to such commercial imitation cheese slices. After storage for 5 months at 45° F. no flavor reversion was detected in the imitation cheese slices of the invention.

What is claimed is:

1. A method for removing stale flavors from dried casein which has developed stale flavors comprising
   (a) providing an initial mixture of dried casein in water to hydrate the casein,
   (b) maintaining said casein in suspension in said water for a period of time sufficient to substantially hydrate said casein,
   (c) removing water from said mixture while maintaining said casein in suspension at a temperature of at least 100° F. while at the same time adding fresh makeup water to said mixture at substantially the same level that water is removed from said mixture, and
   (d) recovering said casein from said mixture.

2. A method in accordance with claim 1 wherein said mixture is maintained at a temperature of from about 100° F. to about 150° F. during step (c).

3. A method in accordance with claim 2 wherein said mixture is maintained at substantially the isoelectric pH of said casein at the temperature of said mixture during step (c).

4. A process in accordance with claim 3 wherein the pH of said mixture is maintained at from about 4.4 to about 4.7.

5. A method in accordance with claim 1 wherein the rate of removal of water and the rate of addition of water is such that the level of casein in said mixture is maintained within the range of from about 8% to about 15% by weight.

6. A method in accordance with claim 1 wherein the amount of water removed from said mixture and the amount of makeup water added in step (c) is from about 5 to about 8 times the amount of water present in said initial mixture.

7. A method in accordance with claim 1 wherein said hydration time period is from about 30 minutes to about 90 minutes.

8. A method in accordance with claim 1 wherein said casein is recovered from said mixture by centrifugation.

9. A method in accordance with claim 8 wherein said recovered casein has from about 40% to about 60% by weight of water.

10. A method in accordance with claim 1 wherein said water removal and fresh water addition steps take place over a period of from about 30 minutes to about 150 minutes.

11. A method in accordance with claim 1 wherein said water is removed from said mixture through a foraminous material having a pore size sufficiently small to restrain removal of said casein.

12. A method in accordance with claim 11 wherein said foraminous material is a plastic or metal screen.

13. A method in accordance with claim 11 wherein said pore size is from about 30 to about 120 microns.

14. A method in accordance with claim 1 which is performed on a batch basis.

15. A method in accordance with claim 1 which is performed on a continuous basis.

16. A method in accordance with claim 2 wherein said mixture is maintained at a temperature of from about 100° F. to about 150° F. during step (b).

17. A method for producing an imitation cheese which comprises:
   (a) providing an initial mixture of dried casein which has developed stale flavors in water to hydrate the casein,
   (b) maintaining said casein in suspension in said water for a period of time sufficient to substantially hydrate said casein,
   (c) removing water from said mixture while maintaining said casein in suspension at a temperature of at least 100° F. while at the same time adding fresh makeup water to said mixture at substantially the same level that water is removed from said mixture, and
   (d) recovering said casein from said mixture.

18. A method in accordance with claim 17 wherein said mixture is maintained at a temperature of from about 100° F. to about 150° F. during step (c).

19. A method in accordance with claim 17 wherein said mixture is maintained at substantially the isoelectric pH of said casein at the temperature of said mixture during step (c).

20. A method in accordance with claim 17 wherein the pH of said mixture is maintained at from about 4.4 to about 4.7.

21. A method in accordance with claim 17 wherein the rate of removal of water and the rate of addition of water is such that the level of casein in said mixture is maintained within the range of from about 8% to about 15% by weight.

22. A method in accordance with claim 17 wherein the amount of water removed from said mixture and the amount of makeup water added in step (c) is from about 5 to about 8 times the amount of water present in said initial mixture.

23. A method in accordance with claim 17 wherein said hydration time period is from about 30 minutes to about 90 minutes.

24. A method in accordance with claim 17 wherein said casein is recovered from said mixture by centrifugation.

25. A method in accordance with claim 24 wherein said recovered casein has from about 40% to about 60% by weight of water.

26. A method in accordance with claim 17 wherein said water removal and fresh water addition steps take place over a period of from about 30 minutes to about 150 minutes.

27. A method in accordance with claim 17 wherein said water is removed from said mixture through a foraminous material having a pore size sufficiently small to restrain removal of said casein.

28. A method in accordance with claim 27 wherein said foraminous material is a plastic or metal screen.

29. A method in accordance with claim 28 wherein said pore size is from about 30 to 120 microns.

30. A method in accordance with claim 18 wherein said mixture is maintained at a temperature of from about 100° F. to about 150° F. during step (b).

* * * * *